United States Patent [19]

Yang

[11] Patent Number: 4,711,784

[45] Date of Patent: Dec. 8, 1987

[54] ENCAPSULATION COMPOSITION FOR USE WITH CHEWING GUM AND EDIBLE PRODUCTS

[75] Inventor: Robert K. Yang, Randolph, N.J.

[73] Assignee: Warner-Lambert Company, Morris Plains, N.J.

[21] Appl. No.: 816,769

[22] Filed: Jan. 7, 1986

[51] Int. Cl.⁴ ............................................. A23G 3/30
[52] U.S. Cl. ........................................ 426/5; 426/96; 426/99; 426/548
[58] Field of Search ...................... 426/3-5, 426/96, 98, 99, 103, 548

[56] References Cited

U.S. PATENT DOCUMENTS 4,384,004  5/1983  Cea et al. .................................. 426/5
4,386,106  5/1983  Merritt et al. ........................... 426/5

*Primary Examiner*—Jeanette Hunter
*Attorney, Agent, or Firm*—Daniel A. Scola, Jr.; Gary M. Nath

[57] ABSTRACT

The present invention is method and composition for protecting an active ingredient and providing controlled release therefor, especially in a chewing gum composition, which includes a high molecular weight polyvinyl acetate blended with a hydrophobic plasticizer which forms a film with the high molecular weight polyvinyl acetate in the absence of an added solvent therefor. The active ingredient, such as the artificial sweetener aspartame, is blended into the encapsulating composition as, for example, by melt blend which can then be cooled to a solid and ground into particulate. The encapsulated active ingredient can then be used in a composition for ingestion by a human in the form of, for example, a chewing gum with extended shelf life and highly controlled release of the active ingredient.

19 Claims, No Drawings

ENCAPSULATION COMPOSITION FOR USE WITH CHEWING GUM AND EDIBLE PRODUCTS

BACKGROUND OF THE INVENTION

The present invention relates to the art of providing protection for active food ingredients, and, in particular, to protecting food ingredients by encapsulation.

It has been known in the art of food preparation to provide protection for different ingredients included in food compositions by means of protective coatings. Such protective systems have been employed for various reasons such as for protection of the active ingredient, both while on the shelf and during use, and for prolonged release in the oral cavity and/or systemically. As used herein, "active ingredient" can be an ingredient such as a sweetener, soluble dietary fiber, a flavoring agent, a bio-effecting ingredient, such as a medicinal drug or pharmaceutical agent, and a breath-freshening ingredient.

Protective systems for active ingredients encounter unique problems when used in chewing gum compositions since gum compositions include a soluble portion which is consumed during chewing and an insoluble masticatory portion which remains in the oral cavity as a cud or bolus throughout chewing. The soluble portion is added by blending soluble bulking agents, flavorants, natural and synthetic sweeteners, etc. to the gum base usually in the presence of heat in order to effectuate mixing. Thus, a protective system for an active must be able to withstand the rigors of heat and shear forces. Furthermore, since the gum base includes basically insoluble ingredients such as resins, elastomers, etc., any protection for an active ingredient included in the base would have to be compatible to a certain degree with such components. Depending on the effect desired, the protected active ingredient can be incorporated into the base and/or added with the soluble components or added after compositing.

Dipeptide sweeteners such as L-aspartyl-L-phenylalanine methylester (aspartame), which have been widely recognized as an extremely good-tasting non-caloric sweetener for use in a variety of food products, have been found to be particularly troublesome, especially, when used in chewing gum products. Unfortunately, aspartame is extremely unstable in the presence of moisture and undergoes hydrolytic degradation and subsequent loss of sweetness. Elevated temperatures and specific pH ranges may accelerate the hydrolytic degradation. Additionally, aspartame is known to react with a number of flavorings and chemicals such as aldehydes and ketones. For example, aspartame loses its sweetness due to chemical reactions in the presence of flavor aldehyde-containing oils such as cinnamon. These flavor oils are used in food products and are popular in chewing gum and other confectionery products. These compositions also generally contain moisture and may be exposed to elevated temperatures during their shelf life. The result is the loss of aspartame and the corresponding loss of sweetness contributed thereby in the gum.

For example, U.S. Pat. No. 3,962,463 to Witzel discloses chewing gum containing on its surface tiny capsules of flavoring and/or flavors fixed on an edible substrate which will release the flavor upon mastication. The flavoring ingredient can be micro-encapsulated in gelatin, waxes, polyethylene and the like, and printed on the surface of the gum as an aqueous slurry. The encapsulation can be effected in a conventional manner by blending liquid flavoring with a concentrated aqueous solution of gelatin at a temperature below 25° C. whereby a fine stable emulsion is formed. After treatment to impart moisture resistance, the emulsion can be spray dried while still cool to produce a fine free-flowing powder each particle of which consists of a core of flavoring surrounded by a dry gelatin wall. The gelatin micro-encapsulated flavoring ingredient can be printed on the gum by either direct or off-set Gravure printing. As can be seen, the provision of a protection system according to the above-disclosure is a rather complex procedure which requires an additional manufacturing step in order to be added to the gum product.

Other disclosures show the use of protective encapsulation of artificial sweeteners such as aspartame, saccharin, etc. For example, U.S. Pat. Nos. 4,122,195 and 4,139,639 disclose encapsulation of aspartame in Capsul dextrin and gum arabic. However, such encapsulants have been found to be of only limited effectiveness in preventing degradation of moisture sensitive aspartame since these encapsulants are hydrophilic and moisture-permeable.

U.S. Pat. No. 4,384,004 to Cea, et al. discloses preparation of an artificial sweetener, i.e., APM, in an encapsulated form with at least one layer of a coating material selected from the group consisting of cellulose, cellulose derivatives, starches, carbohydrates, gums, polyolefins, polyesters, waxes, vinyl polymers, gelatin, zein, and mixtures thereof in a ratio of coating material to APM which does not exceed 1:1. This coating material is applied to the APM while it is in solid particle form at temperatures below the decomposition temperature of APM, e.g., up to about 200°, and preferably about 100° to 115° F. The application of the Cea, et al. protective system requires a rather elaborate energy-intensive coating procedure, e.g., fluidized bed coating process, in which a strong upward stream or air current must be provided. This results from, among other things, the requirement of providing the protective coating material in a solvent.

EPA No. 81110320.0, published June 16, 1982 (Publication No. 0053844), to Ajinomoto Co., Inc., discloses a stabilized dipeptide-based sweetening composition comprising (a) from 20 to 60% by weight of solid fat, (b) from 10 to 30% by weight emulsifier, (c) from 10 to 30% by weight polysaccharide and (d) not more than 30% by weight of dipeptide sweetener. The compositions are prepared by heating the mixture of the ingredients, cooling, and pulverizing to obtain powder or granules of the composition to obtain a ASTM mesh size of smaller than 12. Spray drying the mixture is also disclosed.

U.S. Pat. No. 4,105,801 to Degliotti, discloses a confectionary comprising a core portion and a shell adheringly enveloping the core portion, whereby the shell is formed by an intimate mixture of microcrystals of xylitol with a solid fatty substance in a proportion of 0.5 to 15 parts by weight of fatty substance to each 100 parts by weight of xylitol. The fatty substance is preferably a mono-, di- or triglyceride having a melting range of between 20° and 60° C.

While it would seem that hydrophobic encapsulating agents provide better impermeability and gradual release characteristics than hydrophilic coatings, it is not known whether any hydrophobic coatings have been successfully employed in the past for chewing gum ingredients. Most hydrophobic materials which could be used as encapsulants, such as a low molecular weight polyvinyl acetate, waxes and fats, are dissolved in the chewing base when they are mixed into the heated gum mass during the gum manufacturing process.

Other hydrophobic materials such as high molecular weight polyvinyl acetate and styrene butadiene rubber are substantially insoluble in food grade solvents which are required in encapsulating processes. However, U.S. Pat. No. 3,826,847 to Ogawa, et al. discloses encapsulation of seasonings including sugar by use of high molecular weight polymers such as high molecular weight polyvinyl acetate; e.g., having a degree of polymerization of 400. Ogawa, et al. describe combining the seasoning by dissolving the polyvinyl ester in a solvent such as ethanol, ethyl acetate and the like to obtain a 2–30% by weight solution to which the seasoning is subsequently added with agitation in an amount at 1–20 times the polyvinyl ester content to form a homogenous dispersion. Then a liquid which is miscible with the solution but immiscible with the polyvinyl ester, such as ether, hexane, or the like, is slowly added to the dispersion so that polyvinyl ester granules integrated with the seasoning are separated out in the form of non-adhesive particles for incorporation into chewing gum base. The particle size can be less than 20 mesh, and preferably are less than 48 mesh. In order to produce the particulate, however, several decantations are required as well as a drying procedure, such as energy-intensive suction.

Yet another protective system for encapsulation has been disclosed in PCT/US No. 84,00108 including a shellac encapsulant, which is hydrophobic and insoluble in the gum base yet soluble in food-grade solvents, to provide a substantially impermeable coating for active ingredients, such as aspartame. The method of encapsulation can be effected by coating with a shellac-containing solution primarily by a fluidized bed coating method wherein particles of the active ingredient are suspended in a stream of pressurized air and sprayed with a solution of the encapsulating agent. The particles can also be coated in a roller bed coating method wherein a suspension of the active agent and its solvent is deposited on a heated, rotating drum, the solvent being evaporated by the heat leaving coated ingredient particles which are scraped from the roller. In each of these methods, and, generally, all methods of encapsulating which includes a solvent, an energy-intensive step to drive off the solvent is required before use in the end food product.

It is therefore, an object of the present invention to provide an active ingredient protection system which can be easily included in a food composition such as a chewing gum composition without an additional step in the manufacturing process.

Another object of the present invention is to provide an encapsulation system which is highly effective in preventing deterioration from moisture.

A further object of the invention is to provide an encapsulation system which can be applied without the use of a solvent system.

Still another object of the present invention is to provide an encapsulated active ingredient with a highly-controlled release characteristic for use in a food product.

Yet another object of the invention is to provide a protective system for artificial sweeteners which deteriorate in the present of moisture for use in a chewing gum composition.

Another object of the invention is to provide a chewing gum composition with a highly-controlled active ingredient protection and release system.

Other and further objects will become apparent to those skilled in the art in view of the disclosure set forth herein.

BRIEF DESCRIPTION OF THE INVENTION

The present invention includes in one aspect a chewing gum composition containing an active ingredient encapsulated in a solvent free encapsulation composition which includes a blend of a high molecular weight polyvinyl acetate and a hydrophic plasticizer, such blend capable of forming an encapsulating film in the absence of an added solvent. The polyvinyl acetate can have a molecular weight of from 20,000 MWU to about 100,000 MWU, preferably from about 30,000 to about 60,000 MWU, and most preferably about 40,000 MWU. The hydrophobic plasticizer comprises a mono-, di-, or triglyceride, or ester derivative thereof, which have a fatty acid chain of from about 16 to about 22 carbon atoms, and preferably from about 18 to about 20 carbon atoms. The composition can be made such that the ratio of the high molecular weight polyvinyl acetate to hydrophobic plasticizer is from about 5:1 to about 1:5 and is preferably from about 2:1 to about 1:2.

The present invention also includes the encapsulated active ingredient which is protected from deterioration due to moisture and is provided with controlled release for use in a product to be ingested by mammal, the active ingredient being selected from a group consisting of natural and artificial sweeteners, soluble dietary fiber, flavoring agents and bio-effecting agents. The active ingredient can be encapsulated with the encapsulating composition by forming a film thereon in the absence of an added solvent. The ratio of encapsulating composition to active ingredient can be from 1:1 to about 10:1, and is preferably from about 3:1 to about 5:1, depending on the desired rate of release.

When the active component is a sweetener, it can be selected from solid natural or synthetic sweeteners such as amino acid based sweeteners, dipeptide sweeteners, especially aspartame, glycyrrhizin, saccharin and its salts, acesulfame salts, cyclamates, steviosides, talin, dihydrochalcone compounds and mixtures thereof.

The active ingredient which is encapsulated can also be a flavoring agent such as spearmint oil, cinnamon oil, oil of wintergreen (methyl-salicylate), peppermint oil, citrus oil, fruit essences, cinnamyl acetate, cinnaldehyde, citral diethylacetal, dihydrocarvyl acetate, eugenyl formate, p-methyl ambesol, food acids, and mixtures thereof, among others.

Dietary fibers as used herein means a component of food which is non-digestible and non-metabolizable by humans. It is well known that dietary fibers as they occur naturally in food sources also have associated with them a small digestible portion comprising fats, proteins, and carbohydrates. Dietary fiber can be divided into two broad categories: insoluble dietary fibers and water-soluble dietary fibers. For purposes of this invention insoluble dietary fibers mean substantially non-swellable dietary fibers. Soluble dietary fibers mean dietary fiber which is water-soluble or water-swellable. Soluble dietary fibers which can be encapsulated include but are not limited to non-cellulosic polysaccharides, pectin, gums such as guar and locust bean, algal polysaccharides, cellulose, hemi-celluloses, lignin, as well as mixtures thereof.

Finally, when the active ingredient is a bio-effecting agent, it can be selected from the group consisting of mineral supplements, analgesics, antipyretics, antiarrhythmics, ion exchange resins, appetite suppressants, vitamins, anti-inflammatory substances, coronary dilators, cerebral dilators, peripheral vasodilators, anti-infectives, psychotropics, antimanics, stimulants, antihistamines, laxatives, decongestants, gastro-intestinal sedatives, antidiarrheal preparations, anti-anginal drugs, vasodilators, anti-hypertensive drugs, vasoconstrictors and migrane treatments, antibiotics, tranquilizers, antipsychotics, antitumor drugs, anticoagulants and antithrombotic drugs, hypnotics, sedatives, anti-emetics, anti-nauseants, anticonvulsants, neuromuscular drugs, hyper and hypoglycaemic agents, thyroid and antithyroid preparations, diuretics, antispasmodics, uterine relaxants, nutritional additives, antiobesity drugs, anabolic drugs, erythropoietic drugs, antiasthmatics, expectorants, cough suppressants, mucolytics, antiuricemic drugs and mixtures thereof.

The chewing gum composition of the present invention can also include additional other non-encapsulated sweeteners so that sequential release can be effected from the initial burst of flavor throughout a desired time period.

Once the active ingredient is mixed in a melt blend with the encapsulating agent, it can be cooled to a solid, e.g., at temperatures of about 0° C. and then ground to a particulate for use in an ingestible composition such as a food composition, which is in one example a chewing gum. Alternatively the active ingredient can be encapsulated by spray congealing methods.

In one preferred embodiment the chewing gum composition of the invention includes artificial sweeteners such as saccharin and/or aspartame that can be protected from moisture deterioration and can be provided with the controlled release by the encapsulating agent. This is especially effective in use with aspartame which is moisture sensitive, and has been found to increase the shelf life of an aspartame-containing chewing gum at a level well above 60% the original content of aspartame after 65 weeks of shelf life.

According to one process of the present invention, the polyvinyl acetate and plasticizer, which can preferably be glyceryl monostearate, can be blended at a temperature from about 70° C. to about 90° C., and preferably about 85° C., to which the active ingredient can be added and blended, followed by cooling to a solid and grinding to a particulate.

As a result of the present invention, a highly effective protective coating can be provided to an active ingredient in a food or a drug delivery system, without the use of a solvent which must be driven off in order to encapsulate. Furthermore, the protective encapsulating composition can be fine tuned to provide the high degree of control over the release of the active agent, whether by masticatory forces incurred during chewing or by dissolution systemically.

Other advantages of the present invention is that the encapsulating system is noncariogenic, and the use of the present composition does not result in cold flow of polyvinyl acetate during prolonged storage.

Moreover, when glyceryl monostearate is used, it has the unexpected property of inhibiting the hydrolysis of polyvinyl acetate to acetic acid and polyvinyl alcohol. Moreover, because of the hydrophobic nature of the encapsulating agent, artificial sweeteners subject to water hydrolysis, such as aspartame, are stabilized. The encapsulated artificial sweeteners can be used in any food or pharmaceutical application where it is desirable to protect an artificial sweetener from moisture.

When used in a chewing gum composition, chewing gum sweeteners, both natural and artificial which are extracted from the chewing gum during mastication, have a prolonged release which can be controlled by manipulation of the formula used in the encapsulating composition. Consequently, sweetness perception can be extended for 10 to 20 minutes, which is a highly effective prolonged release agent. If encapsulated flavor agent is included with the encapsulating agent, an extended long lasting sweetened flavor perception can also be achieved. When encapsulating aspartame, the moisture degradation usually occurring in chewing gum is stabilized and the gum retains its aspartame content over a long period of time while at the same time providing extended sweetness perception in the gum.

For a better understanding of the present invention, together with further and other objects, reference is made to the following description, taken in conjunction with the accompanying drawings, and its scope will be pointed out in the appended claims.

DETAILED DESCRIPTION OF THE INVENTION

Although the present invention includes a chewing gum composition having a variety of encapsulated active ingredients and combinations thereof, it is particularly effective for providing protection for active ingredients which are sensitive to moisture and undergo degradation or deterioration in the presence of a water environment. Furthermore, the present protective encapsulation system is very effective to provide a highly controlled release of active ingredient from the gum composition. This has been found to be especially effective for the use with artificial sweeteners such as aspartame and saccharin, as well as flavoring agents, etc. which are incorporated into chewing gum compositions, especially when the encapsulated active ingredient is incorporated during the production of the overall composition.

Accordingly, the present protective system includes a composition with a first component of high molecular weight polyvinyl acetate, which can be from 20,000 MWU to 100,000 MWU, preferably 30,000 MWU to 60,000 MWU, and most preferably 40,000 MWU. The molecular weight units as used herein refer to those determined by use of gel permeation chromotography, GPC. High molecular weight polyvinyl acetate, which has been found to be a unique component of the present invention, is a thermoplastic high polymer, having a highly crystalline structure, which makes it brittle. It is also very inert as well as relatively insoluble in most solvents, especially water. Due to the highly crystalline structure and the extremely brittle texture of high molecular weight polyvinyl acetate it would usually not be considered useable in the role of an effective encapsulating composition which simultaneously protects from moisture degradation while at the same time provides highly controllable release of the active ingredient.

However when the high molecular weight polyvinyl acetate is combined with the second component of the unique encapsulating composition of the present invention, which is a hydrophobic plasticizer capable of forming a film in combination with the high molecular weight polyvinyl acetate even in the absence of a solvent therefor, the best qualities of the high molecular weight polyvinyl acetate can be taken advantage of without the accompanying disadvantages related to structure and handling properties. It has been found that the plasticizer which is especially effective in the unique encapsulating composition is a mono-, di- or triglyceride having a melting point of from about 45° C. to about 70° C., which can be readily melt blended with the polyvinyl acetate to provide the desired encapsulating agent even without the use of a solvent. The glyceride should be solid or semi-solid at room temperature in order to be effective. The fatty acid components of the glycerides used herein can have a carbon chain range of from 8 to 22 carbons, and it has been found that glyceryl monostearate is an especially effective plasticizer for polyvinyl acetate having a molecular weight of 40,000 MWU.

When the unique hydrophobic plasticizers and high molecular weight polyvinyl acetate are melt blended in a range of from about 70° to about 90° C. according to the present invention, the usually difficult to coat artificial sweetener aspartame can be readily blended therein effectively completely encapsulating each and every particle for later cooling and grinding into a particulate. Moreover when this composition is provided as an encapsulant for aspartame, which is later incorporated into chewing gum, the resulting product has improved shelf stability and longer lasting sweetness perception.

In addition to simple melting and blending, spray congealing methods are also useful. These methods involve melting and blending the polyvinyl acetate/plasticizer; dispersing the actives at high shear; and atomizing the resultant dispersion or mixture into fine droplets, which solidify when they contact the cooler atmosphere.

Another unusual result is that the active ingredient encapsulated in the polyvinyl acetate/glyceride composition can be added to a gum composition at temperatures comensurate with manufacturing processes so that a separate manufacturing step is not required to effect incorporation into a gum product. This effect is unlike the results achieved with wax and gelatin encapsulants which would readily melt at such temperatures.

The term "glyceride" as used herein refers to glycerides which are esters of glycerol and fatty acids in which one or more of the hydroxyl groups of glycerol had been replaced by acid radicals. It appears that the gylceride component contributes to the flexibility and elasticity of the polyvinyl acetate, which as a blend, forms a film on the active ingredient core material, thus rendering the blend highly effective in its role as an encapsulant.

The encapsulating material can be prepared in a ratio of polyvinyl acetate to glyceride in a ratio of from about 5:1 to about 1:5 and preferably is between from about 2:1 to about 1:2 depending on the type of release desired.

The active ingredient can be selected from a wide variety of materials such as sweeteners, soluble dietary fibers, flavoring agents, and bio-effecting agents such as medicaments and drugs. These materials can also be used either singly or in combination.

The sweetener component may be selected from solid natural or synthetic sweeteners including amino acid based sweeteners, dipeptide sweeteners such as L-aspartyl-L-phenylalanine methylester (aspartame), glycyrrhizin, saccharin and its salts, acesulfame salts, cyclamates, steviosides, talin, dihydrocalcone compounds and mixtures thereof. A particularly effective combination of sweeteners has been found to be aspartame in combination with saccharin which can be prepared in the encapsulating composition in such a manner that they can be released over a period of time either simultaneously or sequentially. In fact, one of the primary advantages of the present inventions is that the encapsulated active ingredient can be composited such that its release is highly controlled by the amount of active ingredient with respect to encapsulating composition.

Flavoring agents useful in the present invention include synthetic solid flavoring agents and/or liquids derived from plants, leaves, flowers, fruits and so forth and combinations thereof. Representative flavoring liquids include: spearmint oil, cinnamon oil, oil of wintergreen (methylsalicylate) and peppermint oils. Also, artificial, natural or synthetic fruit flavors such as citrus oil including lemon, orange, grape, lime and grapefruit and fruit essences including apple, strawberry, cherry, pineapple, can be used.

The amount of flavoring agent employed is normally a matter of preference subject to factors such as flavor type, base type and strength. In general, amounts of 0.5% to about 3% by weight are used in chewing gum compositions with preferred amounts being from about 0.3% to about 1.5%, the most preferred ranges being from 0.7 to about 1.2%.

The active ingredient can also be a bio-effecting agent such as a drug selected from the group consisting of mineral supplements, analgesics, antipyretics, antiarrhythmics, ion exchange resins, appetite suppressants, vitamins, anti-inflammatory substances, coronary dilators, cerebral dilators, peripheral vasodilators, anti-infectives, psychotropics, antimanics, stimulants, antihistamines, laxatives, decongestants, gastro-intestinal sedatives, antidiarrheal preparations, anti-anginal drugs, vasodilators, anti-hypertensive drugs, vasoconstrictors and migrane treatments, antibiotics, tranquilizers, antipsychotics, antitumor drugs, anticoagulants and antithrombotic drugs, hypnotics, sedatives, anti-emetics, anti-nauseants, anticonvulsants, neuromuscular drugs, hyper and hypoglycaemic agents, thyroid and antithyroid preparations, diuretics, antispasmodics, uterine relaxants, mineral and nutritional additives, antiobesity drugs, anabolic drugs, erythropoietic drugs, antiasthmatics, expectorants, cough suppressants, mucolytics, anti-uricemic drugs and mixtures thereof.

As previously explained, active ingredients which are sensitive to moisture and subject to deterioration in the presence of moisture, will particularly benefit from the present protective encapsulation composition and process since they can be protected for extended periods of time. Furthermore, in the case of having a need to effect control led release of a sweetener and bio-effecting agent, the present invention is very effective since release can be directly related to composition proportions. Thus, an active ingredient having, for example, a very bitter taste can be administered to an individual by simply providing a controlled release which is at such a low level that it does not reach the threshold of perception by the consumer. Likewise, drugs can be administered over a prolonged period of time by simply preparing an encapsulating composition which provides a low-level sustained release. A further use is to provide sustained release of a high-intensity sweetener at a very low concentration such that even without increasing the overall amount of sweetener, the perception by the consumer of, for example, a gum composition can be sustained over a period of 10-20 minutes. When incorporating active ingredients into any ingestible composition, non-encapsulated active can also be included in order to effect sequential release of the active to the consumer.

Encapsulated active ingredient can be prepared by blending the ingredients preferably at an elevated temperature such as between 70° C. and 90° C. and adding thereto the active ingredient, followed by cooling the thus formed well-blended active ingredient to a solid and grinding the solid to a particulate, which can be subsequently included in the delivery system. The cooled solid is usually ground sufficiently to enable the particulate to pass through a 30 mesh sieve.

If spray congealing methods for encapsulating are employed, a uniform spherical particle results. Uniformity in size and effectiveness of the coating are also achieved using this method. Thus, the particle size of the spray-congealed encapsulated actives can be controlled by varying the nozzle size, pressure and temperature and grinding is not necessary.

The encapsulated active ingredient is capable of being added to a gum composition at elevated temperatures usually associated gum preparation, such as 45°–55° C., and is capable of withstanding high shear associated with high-speed mixing, stirring or screw extruding.

SPECIFIC EXAMPLES OF THE INVENTION

The present examples relate to the preparation of encapsulated artificial sweeteners, e.g., aspartame and saccharin formulation, which when incorporated into chewing gums, provides improved shelf stability and longer lasting sweetness perception.

It is known that commercially available chewing gum products, generally comprised of plasticizers, softeners, flavors and sweeteners, experience a quick release of the sweeteners, e.g., in about 4–5 minutes, so that sustained sweetness perception is lost. Furthermore, sugarless chewing gums exhibit a noticeably low initial sweetness perception and lack the present impact of sugar-containing gums. Artificial sweeteners such as saccharin and aspartame have been used to provide the strong initial sweetness impact, but due to rapid release of the sweeteners, the sweetness intensity decreases very rapidly. High concentrations of saccharin are not acceptable in that they lead to a bitter aftertaste of saccharin, whereas aspartame undergoes degradation during aging of the gum and also loses its sweetness. Thus, in one of the embodiments of the present invention, these problems can be avoided by the use of encapsulated saccharin and/or aspartame in anhydrous gum.

The encapsulated saccharin can be released at a controlled rate throughout the duration of chewing rather than in only the initial few minutes, thus, reducing and even concealing its bitter aftertaste even at high concentration. Furthermore, the encapsulated aspartame will not undergo degradation and lose its sweetness during aging in addition providing a sustained release during chewing. Thus, by use of the present encapsulating composition prepared and coated on the artificial sweeteners which are included in anhydrous gum, sustained sweetness perception can be imparted to the chewing gum product while moisture deterioration problems experienced by aspartame are significantly reduced.

Examples have been prepared in accordance with the present invention to provide anhydrous chewing gum having longer-lasting sweetness impact, these examples having compositions including chewable gum base, flavor, sweetener in an amount sufficient to impart normal accepted sweetness to the gum, and an amount of encapsulated artificial sweetener including saccharin and L-aspartyl-L-phenylalanine methylester (APM) effective to produce longer-lasting sweetness in the gum. The chewing gum compositions can be either sugar-containing or sugarless with no extra water present in either case. The saccharin and APM have been encapsulated in a combination of high molecular weight polyvinyl acetate and glyceryl monostearate.

EXAMPLE 1

Encapsulated aspartame was prepared using 50 grams of polyvinyl acetate and 100 grams of glyceryl monostearate which were melted and mixed by mechanical stirring at a temperature of about 85° C. for about five minutes. After removing the melt blend from the heat, 40 grams of finely ground aspartame was added and blended into the molten mass thoroughly for an additional five minutes. The resulting semi-solid mass was chilled to obtain a solid, e.g., to 0° C., and ground sufficiently so that the resulting particulate passed through a 30 mesh sieve. The sample was subjected to APM analysis and found to contain 21% APM of the total weight, indicating negligible degradation or loss of APM during the preparation.

EXAMPLE 2

The process of Example 1 was repeated using 120 grams of polyvinyl acetate and 62 grams of glyceryl mono- stearate in preparing the coating mixture, to which 60 grams of saccharin were added in place of the aspartame shown in Example 1. Chemical analysis of the resulting particulate indicated a free saccharin content of 24.6%, thus also indicating negligible loss during preparation.

EXAMPLES 3 AND 4

Following the procedure of Example 1 the following compositions of encapsulated aspartame and saccharin were also prepared.

|  | Parts by weight (g) Example No. | |
| --- | --- | --- |
| Ingredients | 3 | 4 |
| Polyvinyl Acetate | 20 | 35 |
| Glyceryl Monostearate | 30 | 15 |
| APM | 5 | — |
| Saccharin | — | 5 |
| % APM Found (total weight basis) | 9.1 | — |
| % APM Found (% of APM added) | 100.0 | — |
| % Saccharin Found (total weight basis) | — | 9.2 |
| % Saccharin Found (% of saccharin added) | — | 100.0 |

EXAMPLES 5–9

Using the encapsulated artificial sweeteners made in Examples 1–4 chewing gum product samples were made as shown in Table I:

TABLE I

| Ingredients | Chewing Gum Compositions Parts by Weight | | | | | |
|---|---|---|---|---|---|---|
| | Control | Ex. 5 | Ex. 6 | Ex. 7 | Ex. 8 | Ex. 9 |
| Gum Base | 26.4 | 26.4 | 26.4 | 26.4 | 26.4 | 26.4 |
| Triacetin | 1.3 | 1.3 | 1.5 | — | — | — |
| Vegetable Oil | — | — | — | 1.7 | 1.5 | — |
| Sugar | 70.6 | 69.1 | — | — | 69.5 | — |
| Sorbitol | — | — | 70.3 | 68.0 | — | 68.2 |
| Peppermint Oil | 1.2 | 1.2 | 1.2 | 1.2 | 1.2 | 1.2 |
| Ex. 1 Encapsulated APM | — | 1.8 | — | — | — | — |
| Ex. 2 Encapsulated SAC | — | — | 0.4 | — | — | — |
| Ex. 3 Encapsulated APM | — | — | — | 2.6 | — | 2.6 |
| Ex. 4 Encapsulated SAC | — | — | — | — | 1.2 | — |
| Free APM Powder | 0.3 | — | — | — | — | — |

The above compositions were prepared by adding the sugar or sorbitol and encapsulated sweetener at approximately the same time under mechanical stirring and in the absence of added heat for five minutes. The molten gum base along with the softener, previously melted at approximately 95° C., was transferred into the mixer and mixed for three minutes. The finished gum product was rolled and scored.

In order to evaluate the stability of encapsulated APM in chewing gums as in Examples 5, 7 and 9, a control batch with free APM was also prepared. These batches were subjected to observation at room temperature over a period of at least 50 weeks or more. The results obtained have been set forth below in Table II:

TABLE II

| Stability of Encapsulated APM in Chewing Gum (20° C.) | | | | | | |
|---|---|---|---|---|---|---|
| | | APM Level (ppm) | | | | |
| Example No. | Theoretical | Initial | 2 Wks | 3 Wks | 50 Wks | 65 Wks |
| Control | 3000 | 2750 | 1400 | — | 250 | — |
| 5 | 3750 | 3680 | — | 3450 | 2710 | — |
| 7 | 2340 | 2280 | 2290 | — | — | 1570 |
| 9 | 2340 | 2260 | 2250 | — | — | 1560 |

The results reported above clearly indicate a significantly superior performance of the product made by use of the present invention.

The chewing gums prepared in accordance with the invention have been found to retain discernible sweetness perception for as long as 30 minutes of continuous chewing. Encapsulated APM, prepared in accordance with the present invention, when incorporated to the anhydrous chewing gum formulation has been found to exhibit an excellent stability. When stored at 20° C. (room temperature) for 65 weeks, the gum products were found to retain over 69% of their initial APM.

Furthermore, the chewing gums prepared in accordance with the invention have been found to retain discernible sweetness perception for as long as 30 minutes of continuous chewing.

Thus while there have been described what are presently believed to be the preferred embodiments of the present invention, those skilled in the art will realize that other and further embodiments can be made within the true scope of the invention, and is intended to claim all such changes and modifications.

I claim:

1. A chewing gum composition containing a sweetener encapculated in a solvent-free encapsulation composition, wherein the encapsulation composition comprises a blend of high molecular weight polyvinyl acetate having a molecular weight of about 20,000 to about 100,000 MWU and a hydrophobic plasticizer, said polyvinyl acetate and hydrophobic plasticizer being present in a ratio of about 5:1 to about 1:5, and wherein said blend is capable of forming an encapsulating film.

2. The composition of claim 1, wherein said polyvinyl acetate has a molecular weight of from about 30,000 MWU to about 60,000 MWU.

3. The composition of claim 1 wherein said hydrophobic plasticizer comprises a mono-, di- or triglyceride or ester derivatives thereof, said plasticizer having a fatty acid chain of from about 16 to about 22 carbon atoms.

4. The composition of claim 1 wherein said polyvinyl acetate has a molecular weight of about 40,000 and said hydrophobic plasticizer has a fatty acid chain of from 18 to 20 carbon atoms.

5. The composition of claim 1 wherein said ratio is from about 2:1 to about 1:2.

6. The composition of claim 1 wherein said ratio of encapsulating composition to active ingredient is from about 1:1 to about 10:1.

7. The composition of claim 1 wherein said ratio is from about 3:1 to about 5:1.

8. The composition of claim 1 wherein said sweeteners are selected from the group consisting of amino acid-based sweeteners, dipeptide sweeteners, glycyrrhizin, saccharin and its salts, acesulfame salts, cyclamates, steviosides, talin, dihydrochalcone, and mixtures thereof.

9. A chewing gum oomposition containing an encapsulated sweetener wherein the encapsulant comprises a blend of polyvinyl acetate and a hydrophobic plasticizer, said polyvinyl acetate having a molecular weight of from about 20,000 MWU to about 100,000 MWU and said hydrophobic plasticizer selected from the group consisting of mono-, di- and triglycerides having a fatty acid chain length of from about 16 to about 22 carbon atoms wherein said polyvinyl acetate and hydrophobic plasticizer are present in in a ratio of about 5:1 to about 1:5.

10. The chewing gum composition of claim 9 wherein there is additionally included other non-encapsulated sweeteners for sequential release.

11. The product of claim 9 wherein said sweetener is selected from the group consisting of amino acid based sweeteners, dipeptides sweeteners, glycyrrhizin, saccharin and its salts, acesulfame salts, cyclamates, steviosides, talin, dihydrochalcone compounds and mixtures thereof.

12. A process for preparing a chewing gum composition containing a sweetener encapsulated in a solvent free encapsulation composition for protection of said sweetener from deterioration due to moisture comprising:
providing a blend of high molecular weight polyvinyl acetate and a hydrophobic plasticizer, wherein said high molecular weight polyvinyl acetate and hydrophobic plasticizer form a film in combination in the absence of an added solvent,
encapsulating said sweetener with said blend in the absence of an added solvent therefor, and
incorporating said encapsulated sweetener into one of a gum base used in said chewing gum composition or directly into said overall composition during preparation thereof, and in both said base and said composition wherein said high molecular weight polyvinyl acetate is from about 30,000 MWU to about 60,000 MWU and said plasticizer is a mono-, di- or triglyceride having a fatty acid chain weight length of from about 16 to about 22 carbon atoms, said polyvinyl acetate and said hydrophobic plasticizer melt blended in a ratio of polyvinyl acetate to hydrophobic plastizer of from about 5:1 to about 1:5.

13. The process of claim 12 wherein said high molecular weight polyvinyl acetate is about 40,000 MWU and said plasticizer is gylcerol monostearate blended in a ratio of from about 2:1 to about 1:2 of polyvinyl acetate to glyceryl mono-stearate.

14. The process of claim 12 wherein said sweetener is encapsulated by one of melt blending and spray congealing.

15. The process of claim 14 wherein said polyvinyl acetate and said plasticizer are melt blended at a temperature of from about 70° to about 90° C.

16. The process of claim 15 wherein said sweetener is encapsulated by blending in a molten mass resulting from said melt blending, followed by cooling to a solid and grinding to a particulate.

17. The process of claim 16 wherein said particulate is about 30 mesh size.

18. The process of claim 17 wherein said sweetener is one of aspartame and saccharin.

19. The process of claim 12 wherein said encapsulated sweetener is incorporated during gum composition manufacture at a temperature of from about 45° C. to 55° C.

* * * * *

UNITED STATES PATENT AND TRADEMARK OFFICE
CERTIFICATE OF CORRECTION

PATENT NO. : 4,711,784

DATED : December 8, 1987

INVENTOR(S) : Robert K. Yang

It is certified that error appears in the above-identified patent and that said Letters Patent is hereby corrected as shown below:

In Claim 9, line 1, the word "oomposition" should read --composition.--

Signed and Sealed this

Twelfth Day of July, 1988

Attest:

DONALD J. QUIGG

*Attesting Officer*  *Commissioner of Patents and Trademarks*